(12) United States Patent
Walker et al.

(10) Patent No.: US 7,899,048 B1
(45) Date of Patent: Mar. 1, 2011

(54) METHOD AND APPARATUS FOR REMOTELY MONITORING NETWORK TRAFFIC THROUGH A GENERIC NETWORK

(75) Inventors: David S. Walker, San Jose, CA (US); Kalyan K. Ghosh, Santa Clara, CA (US); Thomas J. Edsall, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1398 days.

(21) Appl. No.: 10/346,050

(22) Filed: Jan. 15, 2003

(51) Int. Cl.
*H04L 12/28* (2006.01)

(52) U.S. Cl. ........................ 370/390; 709/224
(58) Field of Classification Search ............... 370/352, 370/389
See application file for complete search history.

(56) References Cited

U.S. PATENT DOCUMENTS

| | | | |
|---|---|---|---|
| 5,481,735 | A | 1/1996 | Mortensen et al. |
| 5,515,376 | A | 5/1996 | Murthy et al. |
| 5,610,905 | A * | 3/1997 | Murthy et al. ............... 370/401 |
| 5,742,604 | A | 4/1998 | Edsall et al. |
| 5,790,554 | A | 8/1998 | Pitcher et al. |
| 5,920,705 | A | 7/1999 | Lyon et al. |
| 6,268,808 | B1 | 7/2001 | Iryami et al. |
| 6,272,180 | B1 | 8/2001 | Lei |
| 6,282,678 | B1 | 8/2001 | Snay et al. |
| 6,324,669 | B1 | 11/2001 | Westby |
| 6,377,571 | B1 | 4/2002 | Tai |
| 6,499,107 | B1 | 12/2002 | Gleichauf et al. |
| 6,553,036 | B1 | 4/2003 | Miller et al. |
| 6,650,641 | B1 * | 11/2003 | Albert et al. ............... 370/392 |
| 6,704,883 | B1 | 3/2004 | Zhang et al. |
| 6,748,431 | B1 | 6/2004 | Feig et al. |
| 6,888,800 | B1 | 5/2005 | Johnson et al. |
| 6,892,287 | B1 | 5/2005 | Millard et al. |
| 6,904,061 | B2 * | 6/2005 | Schmitt et al. ............... 370/535 |
| 6,954,437 | B1 | 10/2005 | Sylvest et al. |
| 6,959,007 | B1 | 10/2005 | Vogel et al. |
| 7,007,208 | B1 | 2/2006 | Hibbert et al. |
| 7,020,715 | B2 * | 3/2006 | Venkataraman et al. ..... 709/236 |
| 7,107,328 | B1 | 9/2006 | Muthiyan et al. |
| 7,124,198 | B2 | 10/2006 | Pinkerton |
| 7,164,657 | B2 | 1/2007 | Phaal |
| 7,206,863 | B1 | 4/2007 | Oliveira et al. |
| 7,292,567 | B2 | 11/2007 | Terrell et al. |
| 7,299,277 | B1 | 11/2007 | Moran et al. |
| 7,310,447 | B2 | 12/2007 | Yano et al. |

(Continued)

OTHER PUBLICATIONS http://en.wikipedia.org/wiki/IP_protocol, considered on Feb. 1, 2007.*

(Continued)

*Primary Examiner*—Ayaz R Sheikh
*Assistant Examiner*—Mounir Moutaouakil
(74) *Attorney, Agent, or Firm*—Hickman Palermo Troung & Becker LLP

(57) ABSTRACT

A method is disclosed for remotely monitoring network traffic through a generic network. A first data packet, which indicates a first destination network element, is received. A second data packet, which contains at least a part of the first data packet, is generated. The second data packet indicates a second destination network element that is configured to monitor network traffic. The second destination network element differs from the first destination network element.

20 Claims, 7 Drawing Sheets

U.S. PATENT DOCUMENTS

| | | | |
|---|---|---|---|
| 7,339,929 B2 | 3/2008 | Zelig et al. | |
| 7,417,978 B1* | 8/2008 | Chou et al. | 370/352 |
| 7,447,197 B2 | 11/2008 | Terrell et al. | |
| 7,474,666 B2 | 1/2009 | Kloth et al. | |
| 7,496,043 B1 | 2/2009 | Leong et al. | |
| 7,536,470 B2 | 5/2009 | Li et al. | |
| 2001/0055274 A1* | 12/2001 | Hegge et al. | 370/229 |
| 2002/0042866 A1* | 4/2002 | Grant et al. | 711/162 |
| 2002/0046289 A1 | 4/2002 | Venkaraman et al. | |
| 2002/0116564 A1 | 8/2002 | Paul et al. | |
| 2002/0136223 A1* | 9/2002 | Ho | 370/395.51 |
| 2002/0143849 A1* | 10/2002 | Newell et al. | 709/200 |
| 2002/0156924 A1 | 10/2002 | Czeuger et al. | |
| 2002/0170004 A1 | 11/2002 | Parrett et al. | |
| 2002/0186697 A1 | 12/2002 | Thakkar | |
| 2002/0191649 A1 | 12/2002 | Woodring | |
| 2003/0026251 A1 | 2/2003 | Morris et al. | |
| 2003/0028634 A1* | 2/2003 | Oshizawa | 709/224 |
| 2003/0040897 A1 | 2/2003 | Murphy et al. | |
| 2003/0043755 A1 | 3/2003 | Mitchell | |
| 2003/0053464 A1* | 3/2003 | Chen et al. | 370/400 |
| 2003/0076779 A1 | 4/2003 | Frank et al. | |
| 2003/0084319 A1 | 5/2003 | Tarquini et al. | |
| 2003/0091037 A1 | 5/2003 | Latif et al. | |
| 2003/0118053 A1 | 6/2003 | Edsall et al. | |
| 2003/0131182 A1 | 7/2003 | Kumar et al. | |
| 2003/0137937 A1 | 7/2003 | Tsukishima et al. | |
| 2003/0152028 A1* | 8/2003 | Raisanen et al. | 370/235 |
| 2003/0202536 A1 | 10/2003 | Foster et al. | |
| 2003/0214913 A1 | 11/2003 | Kan et al. | |
| 2003/0227874 A1 | 12/2003 | Wang | |
| 2004/0034492 A1 | 2/2004 | Conway | |
| 2004/0054758 A1 | 3/2004 | Chang et al. | |
| 2004/0085994 A1 | 5/2004 | Warren et al. | |
| 2004/0086027 A1 | 5/2004 | Shattil | |
| 2004/0146063 A1 | 7/2004 | Golshan et al. | |
| 2004/0153854 A1 | 8/2004 | Agrawal et al. | |
| 2004/0153863 A1 | 8/2004 | Klotz et al. | |
| 2005/0053073 A1 | 3/2005 | Kloth et al. | |
| 2005/0114710 A1 | 5/2005 | Cornell et al. | |
| 2005/0232269 A1 | 10/2005 | Yao et al. | |
| 2005/0232285 A1 | 10/2005 | Terrell et al. | |
| 2006/0056455 A1 | 3/2006 | Ruiz et al. | |
| 2006/0062254 A1 | 3/2006 | Markevitch et al. | |
| 2006/0168321 A1* | 7/2006 | Eisenberg et al. | 709/238 |
| 2006/0274656 A1 | 12/2006 | Paul et al. | |
| 2007/0171914 A1 | 7/2007 | Kadambi et al. | |
| 2007/0208821 A1 | 9/2007 | Pittman | |
| 2007/0258457 A1* | 11/2007 | Sakamoto et al. | 370/392 |
| 2009/0046593 A1 | 2/2009 | Ptasinski et al. | |
| 2009/0103566 A1 | 4/2009 | Kloth et al. | |

OTHER PUBLICATIONS http://en.wikipedia.org/wiki/Network_layer, considered on Feb. 1, 2007.*
http://en.wikipedia.org/wiki/Generic_Routing_Encapsulation, considered on Feb. 1, 2007.*
http://en.wikipedia.org/wiki/MPLS, considered on Feb. 1, 2007.*
http://en.wikipedia.org/wiki/IPv4#Fragmentation, considered on Feb. 1, 2007.*
M. Rajapopal, et al., *Fibre Channel Over TCP/IP (FCIP)*, IETF, Aug. 2002, pp. 1-68.

* cited by examiner

METHOD AND APPARATUS FOR REMOTELY MONITORING NETWORK TRAFFIC THROUGH A GENERIC NETWORK

FIELD OF THE INVENTION

The present invention generally relates to computer network traffic analysis. The invention relates more specifically to a method and apparatus for remotely monitoring network traffic through a generic network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A computer network typically includes multiple network elements. These network elements may include hosts, such as personal computers and workstations, and devices that manage network traffic from the hosts, such as routers, hubs, and switches. A network element may send information to another network element by transmitting one or more data packets through the network.

A data packet may include a protocol-defined header that specifies one or more destination network elements. Network elements may be identified by network addresses. For example, an Internet Protocol (IP) address uniquely identifies a network element within a network that uses IP. An IP header includes a destination IP address of a network element to which the data packet that contains the IP header is to be delivered.

To analyze network traffic on a network, a user may wish to examine the contents of data packets that are transmitted over the network. To examine the contents of all of the data packets that are transmitted through the network, it is useful to receive all of the data packets at a network element that is configured to monitor network traffic. A network element that is configured to monitor network traffic may be called a "sniffer" or an "analyzer."

The analyzer may remotely communicate, through the network, with network elements that communicate data packets to each other. By receiving these data packets, the analyzer can remotely monitor network traffic. Because many of the data packets may not be addressed to the analyzer, the analyzer will not receive all of the data packets unless some mechanism is used to ensure that copies of the data packets are delivered to the analyzer. Unless the mechanism also permits the original data packets to be delivered to their specified destination network elements, the remote monitoring will interrupt network traffic.

One mechanism for delivering copies of data packets to an analyzer uses a group of dedicated virtual local area networks (VLANs). This mechanism copies data packets that are transmitted between a source network element and a destination network element, and sends the copies over a particular VLAN that has been established exclusively to transmit the copies, for that source/destination network element pair, to the analyzer. This mechanism may be referred to as the "Remote Switch Port Analyzer" (RSPAN) mechanism.

The RSPAN mechanism suffers from several disadvantages. In order to monitor all network traffic on a given network using the RSPAN mechanism, every network switch within the network must be configured to use the RSPAN mechanism. Cisco Catalyst 6000 Series switches, from Cisco Systems, Inc., are configured to use the RSPAN mechanism. Unfortunately, many existing network switches are not capable of using the RSPAN mechanism. As a result, the RSPAN mechanism cannot be effectively used to monitor network traffic on a network that may or may not include specifically configured network elements (a "generic network").

At least some existing implementations of the RSPAN mechanism "flood" copies of data packets over a VLAN. In other words, at least some implementations of the RSPAN mechanism broadcast, via the Data-Link Layer, copies of data packets to all network elements that are connected to the VLAN. Such flooding may degrade network performance.

At least some existing implementations of the RSPAN mechanism do not send copies of Bridge Protocol Data Unit (BPDU) packets to an analyzer. BPDU packets may contain information that a network administrator wants to monitor.

At least some existing implementations of the RSPAN mechanism transmit copies of data packets only over trunk links. A trunk link is a physical link, between network element interfaces, that carries data packets for multiple VLANs.

Based on the foregoing, there is a clear need for a way to remotely monitor network traffic through a generic network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for remotely monitoring network traffic through a generic network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Remotely Monitoring Network Traffic Through a Generic Network
   3.1 Process of Enhancing a Network Data Packet By Adding Metadata
   3.2 Process of Encapsulating an Original Data Packet Within Another Data Packet
   3.3 Process of Decapsulating an Original Data Packet From Another Data Packet
4.0 Implementation Mechanisms—Hardware Overview
5.0 Extensions and Alternatives 1.0 General Overview The needs identified in the foregoing Background, and other needs and objects that will become apparent from the following description, are achieved in the present invention, which comprises, in one aspect, a method of remotely monitoring network traffic through a generic network. A first data packet, which indicates a first destination network element, is received. A second data packet, which contains at least a part of the first data packet, is generated. The second data packet indicates a second destination network element that is configured to monitor network traffic. The second destination network element differs from the first destination network element.

In other aspects, the invention encompasses a computer apparatus, and a computer readable medium, configured to carry out the foregoing steps.

2.0 Structural and Functional Overview

Figure 1:
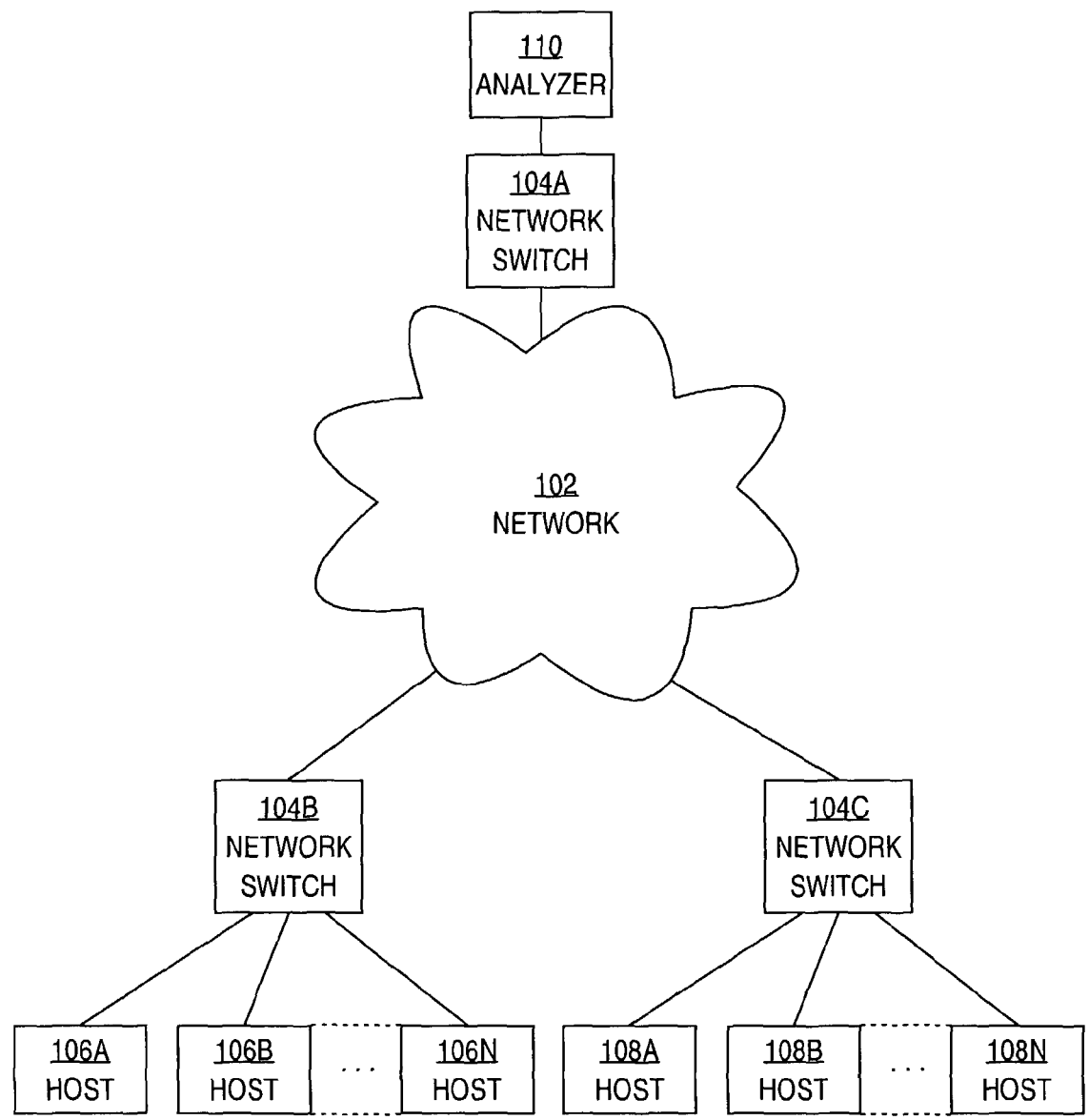
FIG. 1 is a block diagram that illustrates an overview of a system that may be used to practice a method of remotely monitoring network traffic through a generic network.

FIG. 1 is a block diagram that illustrates an overview of a system that may be used to practice a method for remotely monitoring network traffic through a generic network. The system comprises a network 102, network switches 104A-104C, hosts 106A-106N, hosts 108A-108N, and an analyzer 110.

Network switches 104A-104C, hosts 106A-106N, hosts 108A-108N, and analyzer 110 are all network elements. Network elements are routers, switches, hubs, gateways, personal computers, workstations, and other devices that are or can be connected to or communicate with a network. The system shown is just one of many possible different configurations. Other embodiments may include fewer or more system components than those illustrated.

Network switches 104A-104C are communicatively coupled to network 102. Analyzer 110 is communicatively coupled to network switch 104A. Thus, analyzer 110 communicates with network 102 through network switch 104A. Hosts 106A-106N are communicatively coupled to network switch 104B. Thus, hosts 106A-106N communicate with network 102 through network switch 104B. Hosts 108A-108N are communicatively coupled to network switch 104C. Thus, hosts 106A-106N communicate with network 102 through network switch 104C.

Network elements may be communicatively coupled to various other network elements through one or more ports that may be included in those network elements. While numerous network elements are illustrated separately from network 102, from one perspective, all of the network elements illustrated may be considered to comprise a network. Network 102 may be a local area network (LAN), a wide area network (WAN), the Internet, or a subset thereof. Network 102 may contain additional network elements, such as other network switches, routers, hubs, gateways, firewalls, etc.

Hosts 106A-106N and 108A-108N may be end stations such as personal computers and workstations. Hosts 106A-106N and 108A-108N may be network elements such as routers and switches. Each of hosts 106A-106N and 108A-108N may contain a network interface device such as a network interface card. A network interface device is capable of transmitting data packets to and receiving data packets from a network.

Network switches 104A-104C are configured to receive data packets from hosts 106A-106N, hosts 108A-108N, and analyzer 110, determine network addresses for which the data packets are destined, and forward the data packets to devices that are associated with the network addresses.

Network switches 104B-104C are each configured to generate new data packets in response to receiving original data packets from hosts 106A-106N and 108A-108N, respectively. For each original data packet received from a host, network switches 104B-104C are configured to create a new data packet that contains at least a part of the original data packet. Each of the new data packets contains a destination address for analyzer 110. In one embodiment, one or more application specific integrated circuits (ASICs) within each of network switches 104B-104C are configured to generate the new data packets. Alternatively, software approaches in application programs or network element operating systems may be used. Network switches 104B-104C are configured to transmit the new data packets in addition to the original data packets.

Because the original data packets may be destined for network elements other than analyzer 110, the new data packets may indicate destination network elements that are different than the destination network elements that are indicated by the corresponding original data packets. Because each new data packet contains at least a portion of a corresponding original data packet, a new data packet may indicate the destination network element that is indicated by the corresponding original data packet in addition to the destination address for analyzer 110. The identities of destination network elements that are indicated by original data packets may be part of the information that a network administrator wants to monitor.

While network switches 104B-104C are configured to generate new data packets as described above, network 102 may contain additional network switches that are not so configured. Thus, network 102 may be a generic network. Network switches 104B-104C are configured to generate the new data packets to be understandable by any typical network switch that is contained in network 102.

In one embodiment, network switch 104A is configured to extract information from a data packet that is addressed to analyzer 110 and transmit the information, without the remainder of the data packet, to analyzer 110. Network switch 104A may be configured to transmit the information over a VLAN that is dedicated to transmitting information to analyzer 110.

In one embodiment, analyzer 110 is configured to receive the new data packets. Analyzer 110 is configured to produce monitoring data based on the information that is contained in the new data packets, including information that is contained in the original data packets (or parts thereof) that are contained in the new data packets. Thus, analyzer 110 is configured to remotely monitor potentially all network traffic on network 102 that passes through network switches 104B-104C. Analyzer 110 is also configured to remotely monitor network traffic that passes through network switches 104B-104C, even if that network traffic does not pass through network 102. For example, analyzer 110 is configured to remotely monitor data packets that are transmitted from host 106A, through network switch 104B, to any of hosts 106B-106N.

While only one analyzer 110 is illustrated in FIG. 1, some systems may include multiple analyzers. Each analyzer may be configured to generate information based on monitored data packets. Each analyzer may be configured to present such information to a user, such as a network administrator, or to generate information for export to or consumption by another application or system.

3.0 Method of Remotely Monitoring Network Traffic Through a Generic Network

Figure 2:
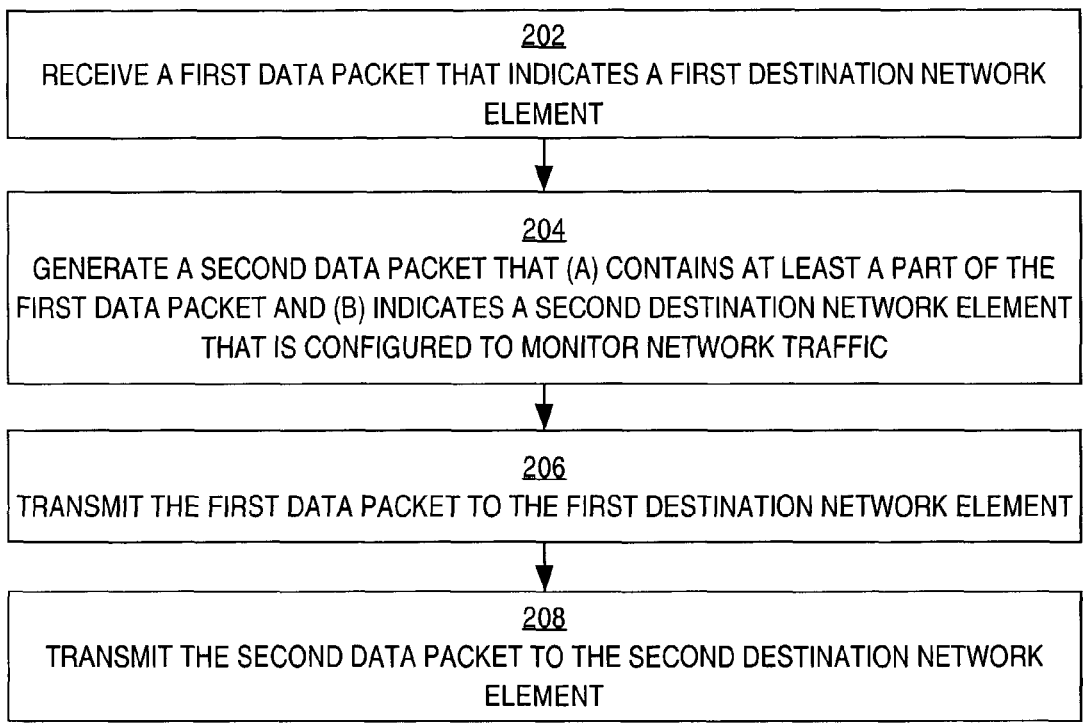
FIG. 2 is a flow diagram that illustrates a high level overview of one embodiment of a method of remotely monitoring network traffic through a generic network.

FIG. 2 is a flow diagram that illustrates a high level overview of one embodiment of a method of remotely monitoring network traffic through a generic network. In one embodiment, the following method is performed for every data packet that is received by a network switch that is configured to perform the method.

In block 202, a first data packet is received. The first data packet indicates a first destination network element. For example, network switch 104B may receive an original data packet from host 106A. The original data packet may indicate that the original data packet is addressed to host 108B. The original data packet may be a BPDU packet.

In block 204, a second data packet is generated. The second data packet contains at least a part of the first data packet. The second data packet indicates a second destination network element that is configured to monitor network traffic. The second destination element may differ from the first destination element. For example, network switch 104B may generate a new data packet that contains the entire original data packet. The new data packet indicates that the new data packet is addressed to analyzer 110.

The first data packet may be rewritten, for normal switching and routing functions, before a network switch transmits the first data packet. For example, if the first data packet is received from an ingress source, then a network switch may make a copy of the first data packet soon after the first data packet is received, and before the first data packet is rewritten. If the first data packet is received from an egress source, then the network switch may make a copy of the first data packet soon before the network switch transmits the first data packet, and after the first data packet is rewritten. Depending on when the first data packet is rewritten, the second data packet may contain the first data packet as rewritten, or not as rewritten.

In one embodiment, the second data packet contains a Generic Routing Encapsulation (GRE) packet header. The GRE protocol is defined in IETF Request for Comments (RFC) 1701. For example, network switch 104B may generate the new data packet by encapsulating the original data packet within the new data packet according to the GRE protocol.

In one embodiment, the second data packet contains a Multiprotocol Label Switching (MPLS) label. The MPLS architecture is defined in IETF RFC 3031. For example, network switch 104B may generate the new data packet by encoding an MPLS label into the new data packet. The MPLS label may be encoded into an encapsulation header that exists specifically for the purpose of containing the MPLS label. Alternatively, the MPLS label may be encoded into an existing Data Link Layer or Network Layer header, provided that the existing header contains a field that is designed to contain an MPLS label or equivalent information.

In one embodiment, the second data packet contains an IP header that indicates the second destination network element. For example, network element 104B may encapsulate the original data packet within a new IP data packet that contains an IP header that indicates that the new IP data packet is destined for analyzer 110.

The new IP data packet may also encapsulate an IP header of the original data packet. The IP header of the original data packet is not used by network switches to route the new IP data packet due to the IP header of the original data packet being encapsulated within the new IP data packet. In other words, the IP header of the original data packet is located within a payload section of the new IP data packet. In one embodiment, the new data packet is an IP version 4 data packet. In an alternative embodiment, the new data packet is organized according to a network protocol, other than IP, that is used by typical network switches to route data packets through a generic network. For example, the new data packet may be organized according to the IPX protocol.

In block 206, the first data packet is transmitted to the first destination network element. For example, network switch 104B may transmit the original data packet, directly or indirectly through one or more other network switches, to host 108B.

In block 208, the second data packet is transmitted to the second destination network element. For example, network switch 104B may transmit the new data packet to analyzer 110. Network switch 104B may transmit the new data packet to analyzer 110 via one or more other network switches. None of the other network switches in the path taken by the new data packet needs to be specially configured to handle the new data packet differently than the original data packet. None of the other network switches in the path taken by the new data packet need to be Cisco Catalyst Series 6000 switches.

In this manner, problems inherent in prior approaches, such as those described in the Background, are overcome. The new data packet may be transmitted to analyzer 110 via network links that do not need to be trunk links. While the new data packet may be transmitted via a VLAN, the new data packet does not need to be transmitted via a specific VLAN. The new data packet does not need to be flooded across a VLAN to ensure that the new data packet reaches analyzer 110. BPDU packets can be transmitted to analyzer 110 because BPDU packets can be encapsulated. The new data packet can traverse any network switches; not merely network switches that are configured according to the RSPAN mechanism.

3.1 Process of Enhancing a Network Data Packet by Adding Metadata

Network administrators often want to monitor information about network traffic in addition to information that is usually contained in data packets that are organized according to well-known network protocols. Some of this additional information may be classified as metadata. Metadata is data that describes other data. In the specific context of network data packet monitoring, data is the original data packet (or at least a part thereof) and metadata is information that is related to the original data packet or the routing of the original data packet.

Source network elements, such as hosts 106A-106N and hosts 108A-108N, may originate data packets and send these data packets to destination network elements via one or more other network elements, such as network switches 104A-104C. As intermediate routing devices, these other network elements may generate metadata about data packets that they receive. Such metadata may be information that was not generated by a source network element that originated a data packet to which the metadata pertains.

Figure 3A:
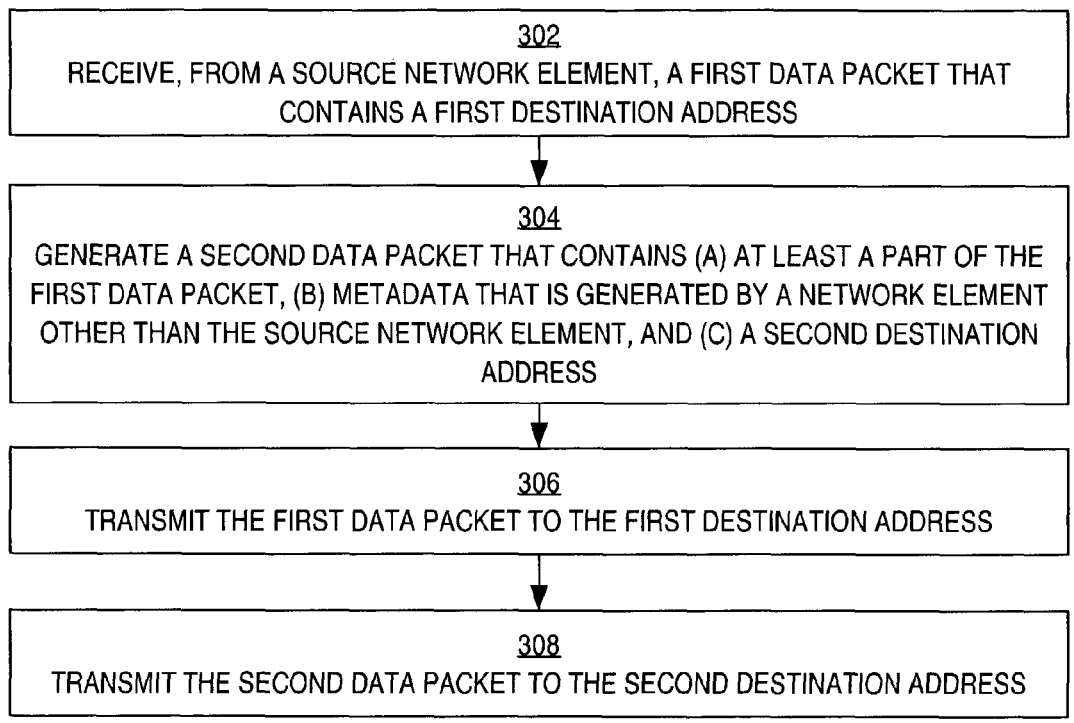
FIG. 3A is a flow diagram that illustrates one embodiment of a process for enhancing a network data packet by adding metadata.

FIG. 3A is a flow diagram that illustrates one embodiment of a process for enhancing a network data packet by adding metadata. In block 302, a data packet that contains a first destination address is received from a source network element. For example, network switch 104B may receive an original data packet from host 106A, which generated the original data packet. The original data packet may be addressed to host 108B.

In block 304, a second data packet is generated. The second data packet contains at least a part of the first data packet. The second data packet also contains metadata that is generated by a network element that differs from the source network element. The second data packet also contains a second destination address, which may differ from the first destination address.

For example, network switch 104B may generate a new data packet that contains at least a part of the original data packet. The new data packet contains metadata that is generated by network switch 104B. The metadata is information that was not generated by host 106A. The metadata may contain information that is used by an analyzer to monitor network traffic. The new data packet is addressed to analyzer 110.

In block 306, the first data packet is transmitted to the first destination address. For example, network switch 104B may transmit the original data packet, directly or indirectly through one or more other network switches, to host 108B.

In block 308, the second data packet is transmitted to the second destination address. For example, network switch 104B may transmit the new data packet, directly or indirectly through one or more other network switches, to analyzer 110.

Figure 3B:
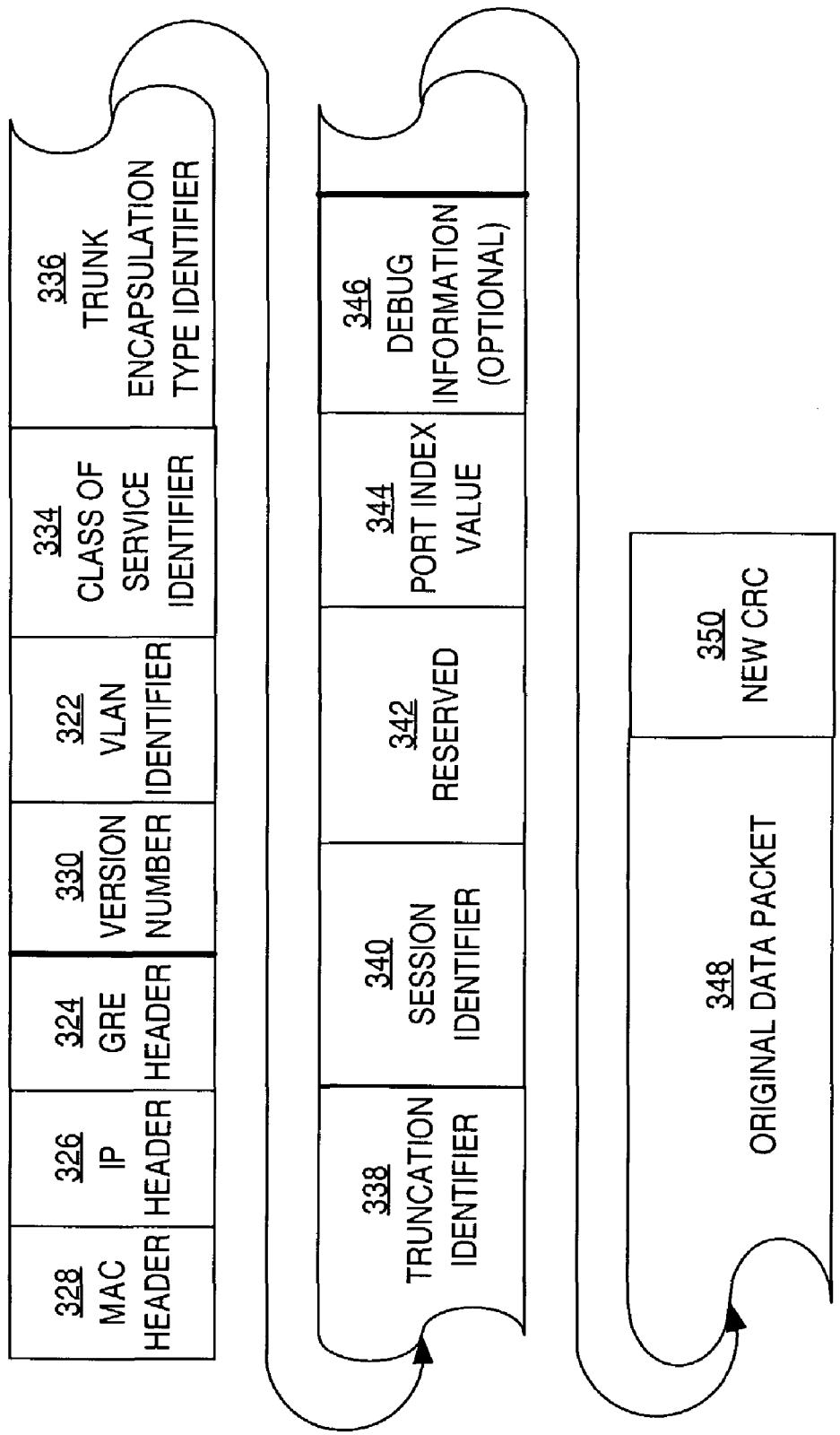
FIG. 3B is a block diagram that illustrates one embodiment of an ERSPAN header that is encapsulated within another data packet.

In one embodiment, the metadata is organized within the new data packet as a header. The header may be referred to as an Enhanced RSPAN (ERSPAN) header. FIG. 3B is a block diagram that illustrates one embodiment of an ERSPAN header that is encapsulated within another data packet. In one embodiment, the ERSPAN header contains fields 330-344, and, optionally, 346. In one embodiment, the ERSPAN header precedes the original data packet 348 within the new data packet. One or more other headers may precede the ERSPAN header in the new data packet. For example, a GRE header 324 may precede the ERSPAN header, an IP header 326 that contains the second destination address may precede the GRE header, and a Media Access Control (MAC) header 328 may precede the IP header. Additionally, a new CRC 350 may follow original data packet 348 in the new data packet. In one embodiment, an ERSPAN header is either 8 bytes long or 136 bytes long, and is organized as follows.

The first 4 bits of the ERSPAN header contain a version number 330. Setting version number 330 to zero indicates that the ERSPAN header is organized according to a special "debug" mode. The debug mode is described in further detail below.

The next 12 bits contain a VLAN identifier 322. VLAN identifier 322 may identify a particular VLAN through which original data packet 348 was transmitted to the network switch that received the original data packet, or the port through which the original data packet was transmitted.

Unlike past approaches in which an original data packet had to be transmitted entirely from source to destination through a dedicated VLAN, in one embodiment, the new data packet—which contains original data packet 348—may be transmitted to a network switch through a VLAN initially, but then continue on through a generic network, through multiple other VLANs or through a LAN that contains no VLAN, to the destination. If the new data packet is initially transmitted to a network switch through a VLAN, then a network administrator might want to know through which VLAN the new data packet was initially transmitted. VLAN identifier 322 may identify the VLAN through which a new data packet was initially transmitted.

The next 3 bits contain a class of service identifier 334 for the original data packet. A class of service may indicate certain requirements, such as minimum bandwidth and latency requirements, which should be considered when deciding how to transmit one or more data packets from source to destination.

The next 2 bits contain a trunk encapsulation type identifier 336 that potentially identifies a VLAN encapsulation protocol that was used to transmit the original data packet. Setting trunk encapsulation type indicator 336 to binary "00" indicates that the original data packet was not encapsulated according to a VLAN encapsulation protocol when the network switch received the original data packet. Setting trunk encapsulation type indicator 336 to binary "01" indicates that the original data packet was encapsulated according to the Inter-Switch Link (ISL) VLAN encapsulation protocol. The ISL protocol is proprietary to Cisco Systems, Inc. Setting trunk encapsulation type indicator 336 to binary "10" indicates that the original data packet was encapsulated according to the IEEE 802.1Q standard VLAN encapsulation protocol.

The next bit contains a truncation identifier 338 that indicates whether the original data packet (or part thereof) that is contained in the new data packet has been truncated. In other words, truncation identifier 338 indicates whether the entirety of the original data packet is contained in the new data packet. In one embodiment, the original data packet that is contained in a new data packet may be truncated if (a) the new data packet is longer than a specified length limit, and (b) an encapsulation fragmentation feature is not enabled. Data packet truncation is the result of data packet size restrictions imposed by some network protocols. The process described herein does not cause data packets to be truncated, but may identify data packets that have been truncated due to other causes.

The next 10 bits contain a session identifier 340 that uniquely corresponds to a set of one or more source network elements and a destination network element. Session identifier 340 may be used to specify that data packets that are generated by one or more specified source network elements are to be monitored by a specified analyzer. Thus, a particular analyzer may monitor a specified subset of all of the traffic on a network while ignoring the remainder of the network traffic. Several analyzers may monitor network traffic that is generated by a specified source network element. One analyzer may monitor network traffic for multiple sessions. For example, analyzer 110 may monitor network traffic for multiple sessions that are supported by network switch 104B, and may also monitor network traffic for multiple sessions that are supported by network switch 104C, wherein each session corresponds to a potentially different set of one or more source network elements and a destination network element.

The next 12 bits, in field 342, may be reserved for purposes that are not necessarily enumerated herein, but could be developed in the future.

The next 20 bits contain a port index value 344 that is uniquely associated with a network switch port through which the original data packet was received from a source network element, or the port through which the original data packet was transmitted.

Depending on whether the version number is set to zero in the ERSPAN header, the ERSPAN header may also contain 128 additional bytes of debug information 346. The debug information may contain one or more internal headers and/or result headers that are specific to a particular implementation of a switch. For example, the debug information may contain an Rbus header or a Dbus header. These kinds of headers are known to be used in some network elements designed by Cisco Systems, Inc. The debug information may contain specific source and destination routing information. The debug information may contain rewrite instructions for changing MAC addresses.

While in one embodiment each ERSPAN header is organized as described above, in alternative embodiments, more or fewer fields may be contained in each ERSPAN header, the fields may be of different lengths, and the fields may be ordered differently.

In one embodiment, the new data packets are generated by one or more ASICs that are contained in a network switch that receives original data packets from one or more source network elements. In one embodiment, the network switch may contain a set of programmable registers from which the ASICs obtain some of the values that the ASICs insert into the new data packets. For example, programmable registers may specify values for the version identifier and the session identifier fields described above. A different version identifier may be programmed for each session, and a different session identifier may be programmed for each network switch port. Alternatively, software implementations may be used.

3.2 Process of Encapsulating an Original Data Packet within Another Data Packet

Figure 4:
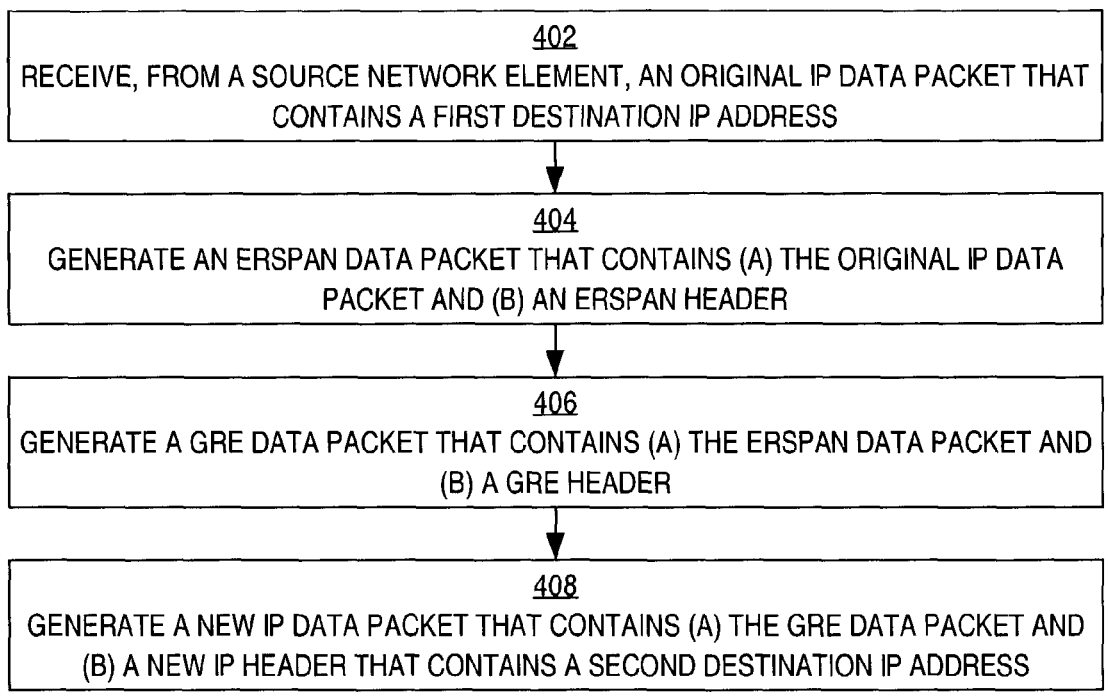
FIG. 4 is a flow diagram that illustrates one embodiment of a process for encapsulating an original IP data packet within a new IP data packet using the Generic Routing Encapsulation (GRE) protocol.

The process of generating a new data packet that contains at least a portion of an original data packet, as described above, may involve encapsulating the original data packet within another data packet using an encapsulation protocol such as GRE. FIG. 4 is a flow diagram that illustrates one embodiment of a process for encapsulating an original IP data packet within a new IP data packet using the GRE protocol.

In block 402, an original IP data packet, which contains a first destination IP address, is received from a source network element. For example, network switch 104B may receive an original IP data packet, which contains a destination IP address that matches the IP address of host 108B, from host 106A. The IP data packet may also contain a MAC header.

In block 404, an ERSPAN data packet is generated. The ERSPAN data packet contains the original IP data packet. The ERSPAN data packet also contains an ERSPAN header, such as is described above. The ERSPAN header precedes the original IP data packet in the ERSPAN data packet. For example, network switch 104B may generate the ERSPAN data packet.

In block 406, a GRE data packet is generated. The GRE data packet contains the ERSPAN data packet. The GRE data packet also contains a GRE header. The GRE header precedes the ERSPAN data packet in the GRE data packet. For example, network switch 104B may generate the GRE data packet.

In one embodiment, the GRE header contains a protocol type identifier whose value is set to uniquely identify the payload of the GRE data packet as an ERSPAN data packet. This value may be used by other network elements, such as network switch 104A and analyzer 110, to decapsulate the ERSPAN data packet from the GRE data packet. The protocol type identifier is typically stored in the third and fourth bytes of the 8-byte GRE header, according to the GRE protocol. For example, network switch 104B may set the value of the protocol type identifier.

In one embodiment, the GRE header contains a sequence number whose value is set to identify the order of the GRE data packet relative to other GRE data packets that belong to the same session. A recipient of the GRE data packet may use this value to re-assemble, in the correct order, information that spans multiple GRE data packets. The sequence number is typically stored in the last 4 bytes of the 8-byte GRE header, according to the GRE protocol. For example, network switch 104B may set the value of the sequence number based on the session that is identified in the ERSPAN header.

In block 408, a new IP data packet is generated. The new IP data packet contains the GRE data packet. The new IP data packet also contains a new IP header. The new IP header contains a second destination IP address that may differ from the first destination IP address. The second destination IP address may be an IP address of a network element, such as analyzer 110, which is configured to monitor network traffic. The new IP header precedes the GRE data packet in the new IP data packet. The new IP data packet may also contain a MAC header. The new IP data packet may also contain a cyclic redundancy check (CRC) value for error correction purposes. For example, network switch 104B may generate the new IP data packet. If the new IP data packet exceeds a specified length, then network switch 104B may set a bit in the ERSPAN header to indicate to a recipient that the original data packet was truncated before it reached its destination.

In one embodiment, the new IP header contains a flags field and a fragmentation offset field. The flags field includes three bits. One of the bits, if set, indicates that no packet fragmentation will be performed. One of the bits, if set, indicates that the new IP header precedes a fragment of a packet, and that the fragment is not the last fragment of the packet. The fragmentation offset field indicates the offset of the fragment from the beginning of the fragmented packet, which can be used to re-assemble the fragments of a packet. The flags are typically stored in the first three bits of the 7th byte of the 20-byte new IP header. The fragmentation offset is typically stored in the remainder of the 7th byte and the 8th byte of the new IP header.

Both the original IP data packet and the new IP data packet may be delivered to their respective destinations. For example, the original IP data packet may be delivered to host 108B, as specified by the first destination IP address, and the new IP data packet may be delivered to analyzer 110, as specified by the second destination IP address.

In one embodiment, the new IP data packet is fragmented before it is transmitted, and each fragment of the new IP data packet is separately delivered to its destination. In one embodiment, each fragment contains the new IP header. However, an IP header in one fragment indicates a different fragmentation offset than an IP header in another fragment, thus indicating the fragment's position relative to the other fragments of the new IP data packet. In one embodiment, only the beginning fragment contains the GRE header and the ERSPAN header; the following fragments do not.

In one embodiment, a new CRC is generated for the new IP data packet and included in the new IP data packet. The new CRC differs from the original CRC contained in the original IP data packet.

3.3 Process of Decapsulating an Original Data Packet from Another Data Packet

Decapsulation is the reverse process, or in other words, the inverse function, of encapsulation. Encapsulation places one entity within another entity. Decapsulation extracts one entity that was previously encapsulated within another entity.

As is described above, a data packet may encapsulate an original data packet for the purpose of routing the original data packet to a different destination than that specified by the original data packet. Consequently, an analyzer may remotely monitor network traffic through a generic network. An analyzer may have the ability to decapsulate and use information that has been encapsulated previously in a data packet. When information is decapsulated from a data packet, that data packet is considered to be "terminated".

However, under some circumstances, an analyzer might not be capable of decapsulating information that has been encapsulated according to certain techniques. For example, an existing network sniffer might not be configured to decapsulate an ERSPAN data packet from a GRE data packet. The network sniffer might not even be aware that a data packet that the network sniffer has received encapsulates another data packet.

Under such circumstances, the network sniffer might display, to a network administrator, more than the encapsulated information that the network administrator wants to see. Even worse, because the network sniffer may be configured to interpret certain bytes of a data packet as being a part of a specific field, the network sniffer might represent the information to the network administrator incorrectly.

Figure 5:
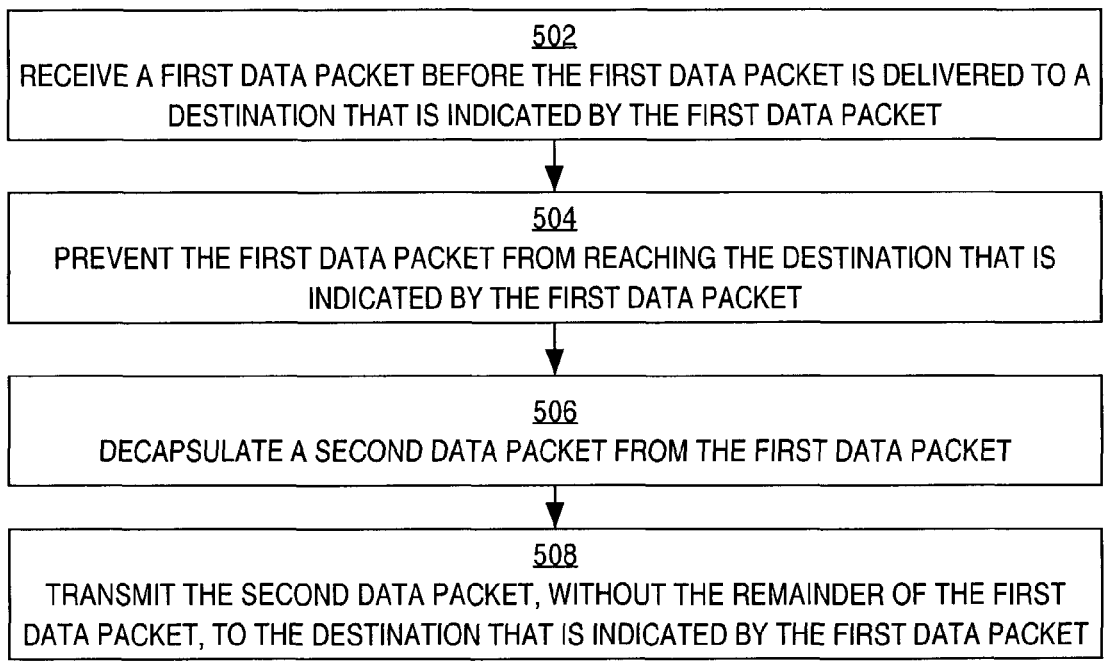
FIG. 5 is a flow diagram that illustrates one embodiment of a process for decapsulating information from a data packet and sending that information to an analyzer.

FIG. 5 is a flow diagram that illustrates one embodiment of a process for decapsulating information from a data packet and sending that information to an analyzer. In block 502, a first data packet is received before the first data packet is delivered to a destination that is indicated by the first data packet. For example, network switch 104A may receive a data packet that is addressed to analyzer 110. The data packet may be received after it has been transmitted through much of a generic network such as the Internet.

In block 504, the first data packet is prevented from reaching the destination that is indicated by the first data packet. For example, upon identifying the first data packet as a data packet that encapsulates monitoring information, network switch 104A may refrain from transmitting the first data packet to analyzer 110.

In block 506, a second data packet is decapsulated from the first data packet. For example, network switch 104A may decapsulate, according to the GRE protocol, an original data packet from a GRE data packet into which the original data packet was encapsulated. Network switch 104A is not restricted to decapsulating data packets that are associated with any particular session. Thus, network switch 104A may decapsulate multiple data packets, wherein each such data packet may be associated with a different session or the same session as any other data packet.

In block 508, the second data packet is transmitted, without the remainder of the first data packet, to the destination that is indicated by the first data packet. The second data packet may be so transmitted even though the second data packet does not indicate the destination that is indicated by the first data packet. For example, network switch 104A may transmit the original packet over a VLAN that is dedicated to transmitting monitoring information to analyzer 110. In one embodiment, the second data packet may be directly sent to analyzer 110 if analyzer 110 is attached to network switch 104A. In one embodiment, the second data packet may be transmitted using the RSPAN mechanism described above.

Thus, monitoring information may be supplied to an analyzer through a generic network regardless of whether the analyzer is configured to decapsulate the monitoring information from data packets that previously encapsulated the monitoring information.

4.0 Implementation Mechanisms—Hardware Overview

Figure 6:
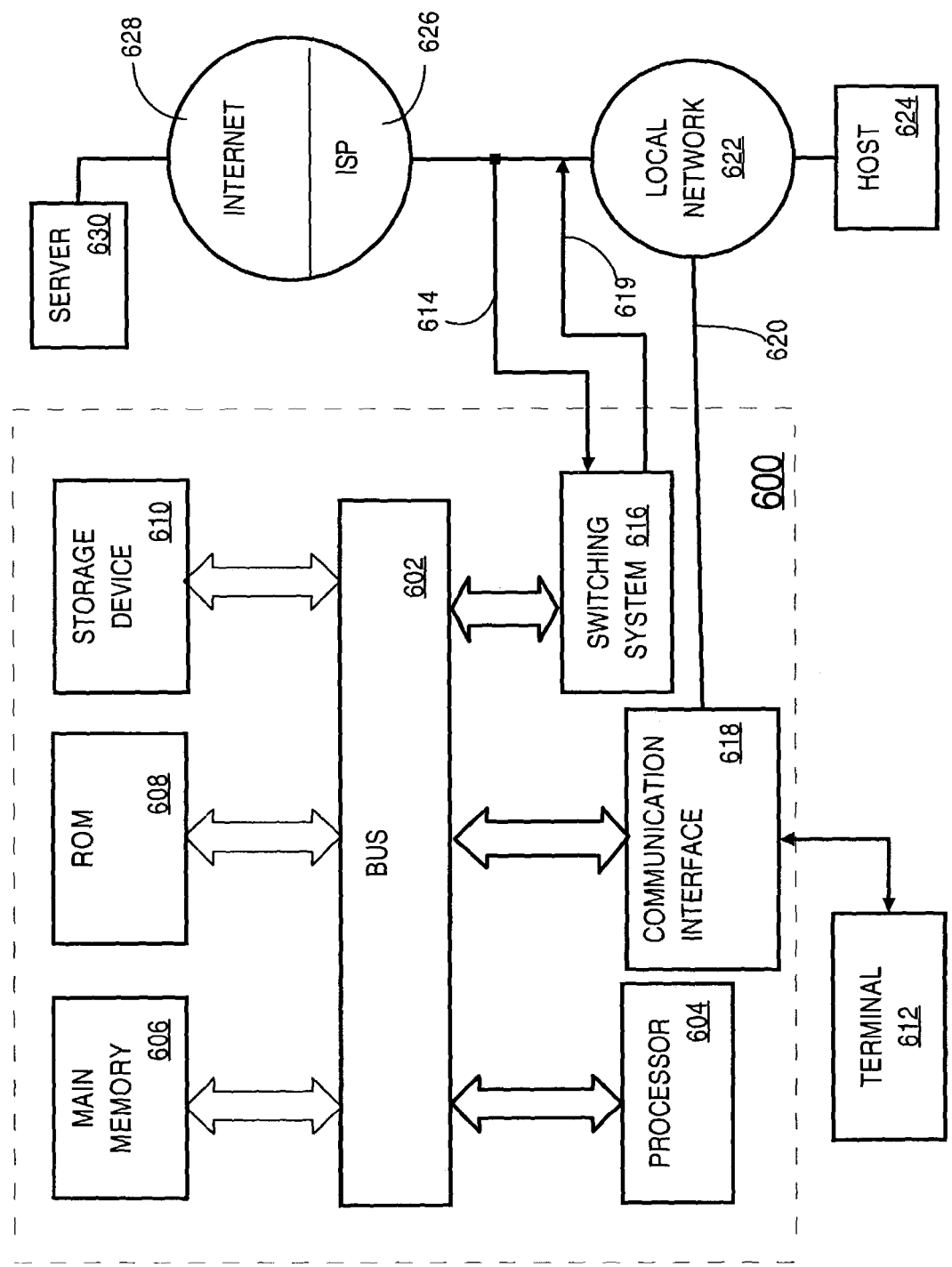
FIG. 6 is a block diagram that illustrates a computer system upon which an embodiment may be implemented.

FIG. 6 is a block diagram that illustrates a computer system 600 upon which an embodiment may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for remotely monitoring network traffic through a generic network. According to one embodiment, remote monitoring of network traffic through a generic network is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for the remote monitoring of network traffic through a generic network as described herein.

Processor 604 may execute the received code as it is received and/or stored in storage device 610, or other non-volatile storage, for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope. The specification and drawings are, accordingly, to be regarded in an illustrative rather than a restrictive sense.

What is claimed is:

1. A method of remotely monitoring network traffic through a generic network, the method comprising:
    receiving a first data packet including a first header that indicates a first destination network element;
    wherein the first data packet is a data packet in a plurality of variable-length data packets to be monitored;
    generating a second data packet that contains at least a part of the first data packet, wherein the second data packet comprises a new Internet Protocol (IP) header that indicates a second destination network element that is configured to monitor network traffic, wherein the second destination network element differs from the first destination network element;
    wherein the second data packet further comprises metadata about the first data packet that was not originally in the first data packet;
    wherein the metadata comprises a virtual local area network (VLAN) identifier that identifies a VLAN from which the first data packet originated;
    wherein the part of the first data packet includes the first header that indicates the first destination network element; and
    forwarding the first data packet towards the first destination network element and separately forwarding the second data packet towards the second destination network element;
    wherein the method is implemented by one or more computing devices.

2. The method of claim 1, wherein the second data packet contains a Generic Routing Encapsulation (GRE) packet header.

3. The method of claim 1, wherein the second data packet contains a Multiprotocol Label Switching (MPLS) label.

4. The method of claim 1, wherein the steps of claim 1 are performed by a first intermediate network element, and wherein a second intermediate network element further performs:
    receiving the second data packet before the second data packet is received by the second destination network element; and
    sending said at least a part of the first data packet to the second destination network element without a part of the second data packet that indicates the second destination network element.

5. The method of claim 1, wherein the steps of claim 1 are performed by a first intermediate network element, and wherein a second intermediate network element further performs:
    receiving the second data packet before the second data packet is received by the second destination network element; and
    sending said at least a part of the first data packet to the second destination network element through a virtual local area network (VLAN) that is dedicated to sending information to the second destination network element.

6. A method of remotely monitoring network traffic through a generic network, the method comprising:
receiving, from a source network element, a first data packet including a first Internet Protocol header that contains a first destination Internet Protocol (IP) address;
wherein the first data packet is a data packet in a plurality of variable-length data packets to be monitored;
generating first data that contains at least a part of the first data packet and metadata that is generated by a network element that is connected to the source network element;
wherein the metadata comprises information about the first data packet that was not originally in the first data packet;
wherein the metadata comprises a virtual local area network (VLAN) identifier that identifies a VLAN from which the first data packet originated;
generating second data that contains the first data and a Generic Routing Encapsulation (GRE) packet header;
wherein the first data includes the first Internet Protocol header that indicates the first destination IP address;
generating a second data packet that comprises a new packet header that contains the second data and a second destination IP address that differs from the first destination IP address, wherein the second destination IP address identifies a network element that is configured to monitor network traffic;
transmitting the first data packet to the first destination IP address; and
separately transmitting the second data packet to the second destination IP address;
wherein the method is implemented by one or more computing devices.

7. The method of claim 6, wherein the GRE packet header contains a protocol type identifier that uniquely identifies a protocol according to which the metadata is structured.

8. The method of claim 6, wherein the GRE packet header contains a sequence number that identifies an order of the second data packet relative to other data packets that specify a same session as the second data packet.

9. The method of claim 6, wherein the steps of claim 6 are performed by a first intermediate network element, and wherein a second intermediate network element further performs:
receiving the second data packet before the second data packet is received by a destination network element that has the second destination IP address;
preventing the second data packet from reaching the destination network element;
extracting the first data from the second data packet; and
transmitting the first data to the destination network element.

10. The method of claim 6, wherein the steps of claim 6 are performed by a first intermediate network element, and wherein a second intermediate network further performs:
receiving the second data packet before the second data packet is received by a destination network element that has the second destination IP address;
extracting the first data from the second data packet; and
transmitting the first data through a virtual local area network (VLAN) that is dedicated to sending information to the destination network element.

11. The method of claim 6, further comprising:
fragmenting the second data packet;
wherein transmitting the second data packet comprises transmitting multiple fragments of the second data packet;
wherein each fragment indicates its position relative to other fragments of the second data packet;
wherein each fragment contains the second destination IP address; and
wherein only the beginning fragment of the multiple fragments contains the GRE packet header and the metadata.

12. A volatile or non-volatile computer-readable medium carrying one or more sequences of instructions for remotely monitoring network traffic through a generic network, which instructions, when executed by one or more processors, cause the one or more processors to carry out the steps of:
receiving a first data packet including a first header that indicates a first destination network element;
wherein the first data packet is a data packet in a plurality of variable-length data packets to be monitored;
generating a second data packet that contains at least a part of the first data packet, wherein the second data packet comprises a new Internet Protocol (IP) header that indicates a second destination network element that is configured to monitor network traffic, wherein the second destination network element differs from the first destination network element;
wherein the second data packet further comprises metadata about the first data packet that was not originally in the first data packet;
wherein the metadata comprises a virtual local area network (VLAN) identifier that identifies a VLAN from which the first data packet originated;
wherein the part of the first data packet includes the first header that indicates the first destination network element; and
forwarding the first data packet towards the first destination network element and separately forwarding the second data packet towards the second destination network element.

13. An apparatus for remotely monitoring network traffic through a generic network, comprising:
means for receiving a first data packet including a first header that indicates a first destination network element;
wherein the first data packet is a data packet in a plurality of variable-length data packets to be monitored;
means for generating a second data packet that comprises a new Internet Protocol (IP) header that contains at least a part of the first data packet, wherein the second data packet indicates a second destination network element that is configured to monitor network traffic, wherein the second destination network element differs from the first destination network element;
wherein the second data packet further comprises metadata about the first data packet that was not originally in the first data packet;
wherein the metadata comprises a virtual local area network (VLAN) identifier that identifies a VLAN from which the first data packet originated;
wherein the part of the first data packet includes the first header that indicates the first destination network element; and
means for forwarding the first data packet towards the first destination network element and separately forwarding the second data packet towards the second destination network element.

14. An apparatus for remotely monitoring network traffic through a generic network, comprising:

a network interface that is coupled to a data network for receiving one or more packet flows therefrom;

a processor; and one or more stored sequences of instructions which, when executed by the processor, cause the processor to carry out the steps of:

receiving a first data packet including a first header that indicates a first destination network element;

wherein the first data packet is a data packet in a plurality of variable-length data packets to be monitored;

generating a second data packet that contains at least a part of the first data packet, wherein the second data packet comprises a new Internet Protocol (IP) header that indicates a second destination network element that is configured to monitor network traffic, wherein the second destination network element differs from the first destination network element;

wherein the second data packet further comprises metadata about the first data packet that was not originally in the first data packet;

wherein the metadata comprises a virtual local area network (VLAN) identifier that identifies a VLAN from which the first data packet originated;

wherein the part of the first data packet includes the first header that indicates the first destination network element; and forwarding the first data packet towards the first destination network element and separately forwarding the second data packet towards the second destination network element.

15. The apparatus of claim 14, wherein the second data packet contains a Generic Routing Encapsulation (GRE) packet header.

16. The apparatus of claim 14, wherein the second data packet contains a Multiprotocol Label Switching (MPLS) label.

17. The volatile or non-volatile computer-readable medium of claim 12, wherein the second data packet contains a Generic Routing Encapsulation (GRE) packet header.

18. The volatile or non-volatile computer-readable medium of claim 12, wherein the second data packet contains a Multiprotocol Label Switching (MPLS) label.

19. The volatile or non-volatile computer-readable medium of claim 12, wherein the instructions of claim 12 are performed by a first intermediate network element, and wherein a second intermediate network element further performs:

receiving the second data packet before the second data packet is received by the second destination network element; and sending said at least a part of the first data packet to the second destination network element without a part of the second data packet that indicates the second destination network element.

20. The volatile or non-volatile computer-readable medium of claim 12, wherein the instructions of claim 12 are performed by a first intermediate network element, and wherein a second intermediate network element further performs:

receiving the second data packet before the second data packet is received by the second destination network element; and sending said at least a part of the first data packet to the second destination network element through a virtual local area network (VLAN) that is dedicated to sending information to the second destination network element.

* * * * *